Aug. 25, 1942.   C. V. JOHANSON   2,293,827
ACETYLENE LAMP
Filed Feb. 29, 1940

INVENTOR
CASIMIR V. JOHANSON
BY
ATTORNEY

Patented Aug. 25, 1942

2,293,827

UNITED STATES PATENT OFFICE 2,293,827

ACETYLENE LAMP

Casimir V. Johanson, Cranford, N. J., assignor to The Oxweld Railroad Service Company, a corporation of Delaware Application February 29, 1940, Serial No. 321,395

4 Claims. (Cl. 48—4)

This invention relates to self-contained acetylene lamps, and particularly to that type of acetylene lamps which may be exposed to weather conditions adversely affecting their operation.

An acetylene lamp ordinarily provides illumination by burning acetylene gas which is generated within the lamp itself by the reaction of calcium carbide with water. Heretofore, it has been exceedingly difficult to prevent the water supply within such lamps from freezing when they are subjected to low temperatures because, normally, the illuminating flame is so arranged that a negligible quantity of heat is transferred from the flame to the water.

An object of this invention, therefore, is to provide a simple, durable, inexpensive, and yet efficient acetylene lamp provided with means for preventing the freezing of the water supply when the lamp is subjected to freezing temperatures. Other objects of the invention include, the provision of such a lamp having means for conducting a substantial portion of the intense heat of combustion, as well as the heat of radiation, of the acetylene illuminating flame to the water within the lamp; the provision of such a lamp embodying means for conducting the intense heat of the acetylene flame to the water within the lamp, in which such heat-conducting means may be rendered substantially ineffective when the lamp is subjected to temperatures above freezing; the provision of such a lamp in which the heat-conducting means serves as a connector between the lamp and its reflector housing; and the provision of such a lamp provided with heat-conducting means for transmitting the intense heat of combustion of the acetylene flame to the water within said lamp, and in which said heat-conducting means is adjustable to regulate the rate of heat transfer to the water.

Figure 1:
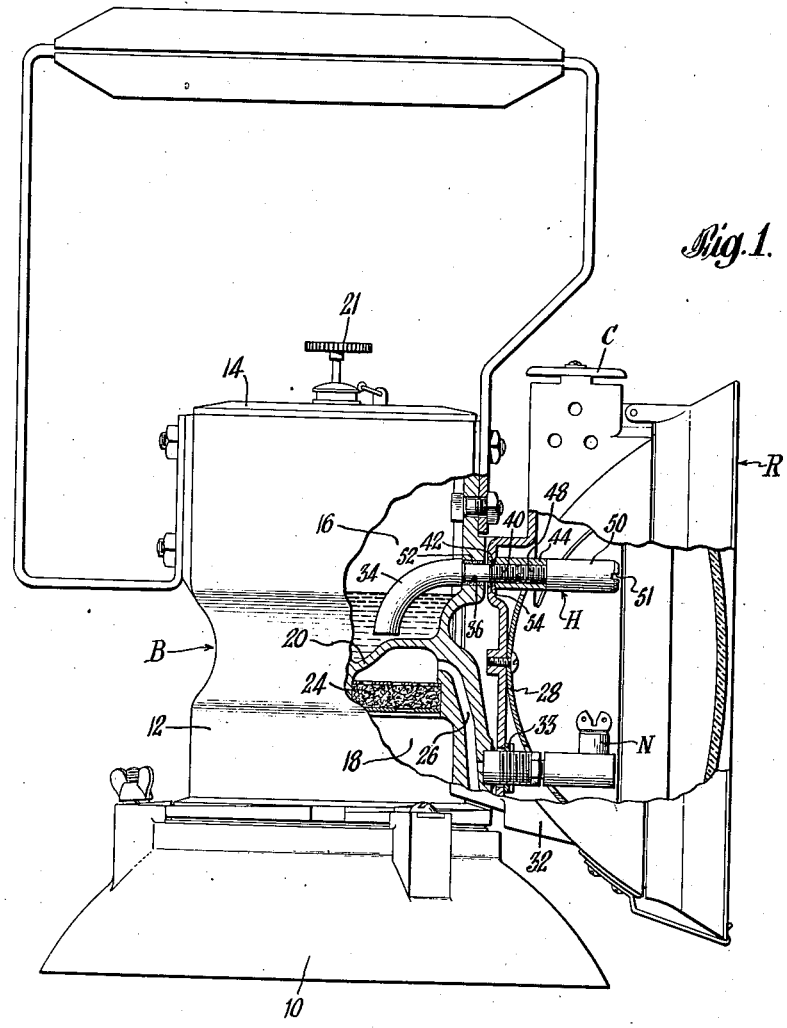
Figure 2:
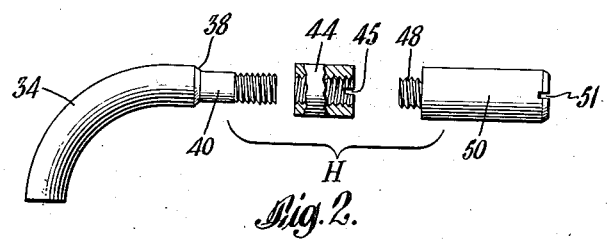

The above and other objects of the invention will become apparent from the following description, considered with the accompanying drawing, wherein:

Fig. 1 is a side elevational view, partly broken away and in section, of an acetylene lamp embodying the principles of the invention; and Fig. 2 is an exploded view showing the separated parts of the water-heating device which is adapted to extend from a point directly above the flame of the lamp to the water within the water reservoir.

The invention is shown, by way of example, as embodied in a portable acetylene lamp of the type disclosed in U. S. Patents Nos. 1,822,625 and 1,855,395 issued on September 8, 1931, and April 26, 1932, respectively, in the names of William F. Hunt and Hermann C. Stelling. The invention, however, may be incorporated in other types of acetylene lamps.

Referring to Fig. 1 of the drawing, the invention is shown as applied to a portable acetylene lamp comprising a hollow body B adapted to contain water in its upper portion and to contain calcium carbide in its lower portion; and a reflector housing R connected to the body B by an illuminating burner or tip N and a multi-piece water-heating device H, the latter of which is constructed of metal such as copper or other material of high heat conductivity. The intense heat of combustion of the acetylene issuing from the burner N raises the temperature of the water-heating device H, which has a forward heat-absorbing portion located adjacent to the burner and directly above the flame. Heat imparted to the forward portion of the device H is transmitted by conduction to the water through a heat transfer portion arranged in heat transfer relation to the upper portion of the body B, thereby maintaining the water at a temperature above its freezing point.

The lamp body B comprises a base 10 upon which is removably secured a substantially cylindrical shell 12. The upper open end of the shell 12 is closed by a removable cap 14, while its lower open end is adapted to form an hermetical seal with the base 10.

A partition 20 divides the shell 12 into upper and lower chambers 16 and 18, respectively. The upper chamber or reservoir 16 is adapted to contain water, which may be restrictively admitted to a charge of calcium carbide within the lower chamber 18 by operating a suitable water feed control mechanism 21, such as the one fully described in Patents Nos. 1,822,625 and 1,855,395. Acetylene generated within the chamber 18 rises and passes through a filter 24 into the upper portion of the chamber 18, from which it discharges through a conduit 26 to the burner N outside of the reservoir 16 where it may be ignited to produce an illuminating flame.

The reflector housing R, which supports a suitable reflector 28, is provided with a boss 32 snugly fitting the cylindrical shell 12, and is fixed to the shell by the assembled water-heating device H as well as by a nut 33 threaded on the illuminating burner N and bearing against the rear wall of the housing.

The water heater H comprises, in the present embodiment, three separate metal parts as shown in detail in Fig. 2. These parts, when assembled, form in effect a continuous and solid heat-conducting means extending between the inside and the outside of the reservoir 16 from a point directly above the burner N through the back wall of the reflector housing R and the wall of the shell 12 into the water reservoir 16. A curved solid metal heat-transfer element 34 extends from a point close to the bottom of the reservoir 16 through an aperture 36 in the side wall of the shell 12 and is adapted to be immersed in the water. The element 34 has a shoulder 38 tightly seating against the inner surface of the reservoir 16 around the aperture 36, and also has a portion 40 of reduced diameter which extends through the aperture 36 as well as through an aligned aperture 42 in the housing R. The forward end of the reduced diameter portion 40 is threaded to receive an internally-threaded coupling element such as a sleeve 44 which abuts against the inner surface of the housing R. In assembling the two elements 34 and 44 in the lamp to form the heat transfer means, an effective connection between the housing R and the shell 12, as well as a water-tight seal between the shoulder 38 and the internal surface of the water reservoir, is provided by screwing the sleeve onto the portion 40 and forcibly against the housing wall, as by using a screw driver inserted into the cross slots 45.

The forward end of the internally-threaded sleeve 44 is adapted to receive the threaded projection 48 of a solid heat absorbing metal element 50, having a screw driver slot 51, which is attachable to and detachable from the sleeve 44 at will. The parts are secured together in such a manner that the ends of metal elements 34 and 50 may abut against each other within the sleeve 44 and form in effect a continuous heat-conducting means. The element 50 is in the form of a stud or arm positioned adjacent to and directly above the burner N between the burner and a chimney C at the top of the housing R; and in such position, the element 50 will absorb a maximum quantity of heat from the illuminating flame without interfering with the desired illumination. By positioning the element 50 directly above the flame in the path of flow of the burned gases to the chimney, the heater H will receive heat from the flame by conduction, convection, and radiation. Because of its solid and in effect continuous construction, the heat-conducting means H is capable of transmitting sufficient heat by conduction directly to the water within the reservoir 16 to prevent the freezing of such water.

For the purpose of insuring the maximum efficiency of heat transfer, bushings 52 and 54, of heat-insulating material, such as asbestos, may be inserted within the apertures 36 and 42, in the shell 12 and housing R, respectively. Furthermore, the aperture in the reflector 28, through which the heater H extends, may be of such size as to prevent contact between it and the heater. In this manner, it is apparent that little if any of the heat absorbed by the stud or arm 50 of the heater H will be transmitted to the surrounding metallic parts of the lamp, and, therefore, a maximum quantity of such heat may be conducted directly to the water within the rservoir 16 for protection in the event of very low temperatures.

When using a lamp embodying the present invention while the temperature is above freezing, it is desirable to prevent overheating of the water within the reservoir 16. The heat transmitted by the heater H to the water may be entirely cut off by completely removing the stud 50 of the heater H from the sleeve 44 of the heat transfer means, which is spaced from the burner N sufficiently to prevent substantially direct heating thereof by the flame; or intermediate regulation of the transmitted heat may be accomplished by adjustment of the stud to vary the area in contact with the sleeve 44. This is done by unscrewing the stud as many turns as desired to reduce the areas in contact and to provide an air gap between the ends 40 and 48.

The particular structure shown as an example of a preferred embodiment of the invention may be changed in form and relative arrangement of parts without departing from the spirit of the invention or the scope of the claims.

What is claimed is:

1. An acetylene lamp comprising the combination with a reservoir for water, and a burner outside of said reservoir adapted to produce a flame; of heat-transfer means extending between the inside and the outside of said reservoir and adapted to be immersed in such water, the portion of said heat transfer means outside of said reservoir being spaced from said burner sufficiently to prevent substantial direct heating thereof by such flame; and heat absorbing means, said heat-absorbing means being attachable to or detachable from said heat-transfer means at will engaged with said heat-transfer means in heat-transfer relation thereto and disposed so as to be heated by such flame.

2. An acetylene lamp comprising the combination with a reservoir for water, and a burner outside of said reservoir adapted to produce a flame; of heat-transfer means extending between the inside and the outside of said reservoir and adapted to be immersed in such water, the portion of said heat-transfer means outside of said reservoir being spaced from said burner sufficiently to prevent substantial heating thereof by said flame; and heat-absorbing means arranged in contact with said heat-transfer means and disposed so as to be heated by such flame, said heat-absorbing means being adjustable relatively to said heat-transfer means to vary the area thereof in contact with the latter and thereby vary the rate of heat transfer to such water.

3. An acetylene lamp comprising the combination with a hollow body having a wall provided with an aperture, said body including a chamber for calcium carbide and a reservoir for water, a separate housing at one side of said body having a wall adjacent to the wall of said body provided with an aperture aligned with said first-named aperture, and a burner in said housing adapted to produce a flame; of a metallic heat-transfer element in said reservoir adapted to be immersed in such water, said heat-transfer element extending through said aligned apertures to the interior of said housing, and said heat-transfer element including a shoulder abutting against the inside of the wall of said hollow body around the aperture therein and providing a seal against the leakage of water; a metallic coupling member threaded over the portion of said heat-transfer element within said housing and abutting against the inside of the wall of said housing around the aperture therein, said heat-transfer element and said coupling member securing together said body and said housing, said coupling member and said heat-transfer element forming together heat-transfer means and being spaced from said burner sufficiently to prevent substantial direct heating thereof by such flame; and a heat-absorbing element engaged with said coupling member in heat-transfer relation thereto and disposed so as to be heated by such flame, said heat-absorbing element being attachable to or detachable from said coupling member at will.

4. An acetylene lamp comprising the combination with a hollow body having a wall provided with an aperture, said body including a chamber for calcium carbide and a reservoir for water, a separate housing at one side of said body provided with an aperture aligned with said first-named aperture, and a burner in said housing adapted to produce a flame; of a metallic heat-transfer element in said reservoir adapted to be immersed in such water, said heat-transfer element extending through said aligned apertures to the interior of said housing, and said heat-transfer element including a shoulder abutting against the inside of the wall of said hollow body around the aperture therein and providing a seal against the leakage of water; and a metallic coupling member threaded over the portion of said heat-transfer element within said housing and abutting against the inside wall of said housing around the aperture therein, said heat-transfer element and said coupling member securing together said body and said housing, said coupling member and said heat-transfer means forming together heat-transfer means and being spaced from said burner sufficiently to prevent substantial direct heating thereof by such flame, and said coupling member being adapted to engage a detachable heat-absorbing element in heat-transfer relation thereto.

CASIMIR V. JOHANSON.

CERTIFICATE OF CORRECTION.

Patent No. 2,293,827. August 25, 1942.

CASIMIR V. JOHANSON.

It is hereby certified that error appears in the printed specification of the above numbered patent requiring correction as follows: Page 2, second column, lines 27 to 30, strike out the comma and words ",said heat-absorbing means being attachable to or detachable from said heat-transfer means at will" and insert the same after "flame" and before the period in line 32, and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.